UNITED STATES PATENT OFFICE.

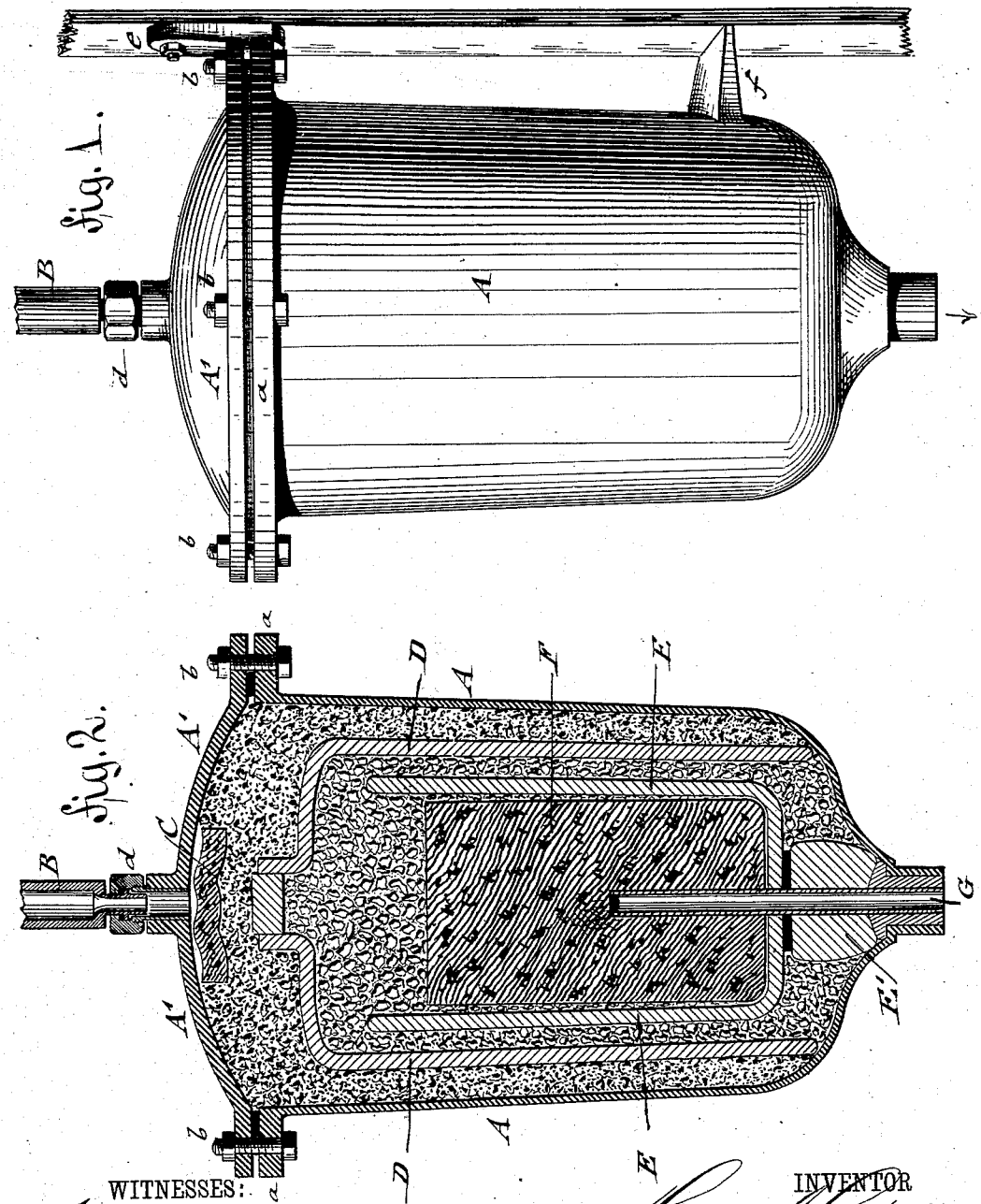

HENRY HARTMANN, OF JERSEY CITY, NEW JERSEY.

WATER-FILTER.

SPECIFICATION forming part of Letters Patent No. 283,103, dated August 14, 1883.

Application filed May 5, 1883. (No model.)

*To all whom it may concern:*

Be it known that I, HENRY HARTMANN, of Jersey City Heights, in the county of Hudson and State of New Jersey, have invented certain new and useful Improvements in Water-Filters, of which the following is a specification.

This invention has reference to an improved device for filtering water for drinking purposes; and it consists of an exterior vessel having water supply and discharge pipes, of an intermediate inverted vessel, and of an innermost cup, the latter being provided with a so-called "filter-stone" that is connected to the discharge-pipe. The intermediate spaces between the different vessels are filled with bone-black and charcoal, as will appear more fully hereinafter.

In the accompanying drawings, Figure 1 represents a side elevation, and Fig. 2 a vertical transverse section, of my improved water-filter.

Similar letters of reference indicate corresponding parts.

A represents an exterior vessel, of suitable cast metal, which is tightly closed by an in-intermediate packing-ring and detachable lid, A′, that is screwed to a flange, a, at the upper end of the vessel A, by a number of fastening-screws, b. The water-supply pipe B is connected by a suitable coupling, d, to the lid A′, and the water discharged from the same onto a corrugated disk, C, of compressed charcoal, which is located immediately below the inlet-opening of the lid A′, so as to distribute the water evenly in the upper part of the vessel A.

At the interior of the exterior vessel, A, is arranged an inverted vessel, D, of glass or other suitable material, that rests loosely in the curved bottom of the vessel A, so that the water can pass between the bottom edge of the vessel D and the bottom of the vessel A. Within the inverted vessel D is arranged a second interior vessel or cup, E, also of glass, which is supported on a stopper, E′, located at the lower part of the vessel A.

In the interior cup, E, is arranged a filtering-stone, F, of burned carbonaceous clay or other composition, to which is centrally applied the discharge-tube G, which passes through the stopper E′ and the bottom of the vessel A. The space between the interior cup, E, and the inverted vessel D is filled with bone-black, while the space between the inverted vessel D and the exterior vessel A is filled with pulverized charcoal. The water, in passing through the filter, is first shed sidewise, then percolated through the pulverized charcoal, then passed through the vessel D in an upward direction, then through the bone-black, and finally through the porous filtering-stone F, being discharged through the pipe G to the outside. The water is thoroughly purified and filtered in its passage through the filtering device, not only of impurities mechanically carried along, but also of impurities of a chemical nature.

The vessel A is supported on the wall by means of a bracket, e, of the flange a, and by a laterally-projecting heel, f, at the lower part of the vessel A, as shown in Fig. 1.

Having thus described my invention, I claim as new and desire to secure by Letters Patent—

A water-filter composed of an exterior vessel, A A′, having supply-pipe B, an intermediate vessel, D, an interior cup, E, a filtering-stone, F, in the cup E, and a discharge-pipe, G, applied centrally to said filtering-stone, the space between the vessels being filled with charcoal and bone-black, substantially as specified.

In testimony that I claim the foregoing as my invention I have signed my name in presence of two subscribing witnesses.

HENRY HARTMANN.

Witnesses:
OTTO RISCH,
SIDNEY MANN.